(12) United States Patent
Ishii et al.

(10) Patent No.: US 8,238,286 B2
(45) Date of Patent: Aug. 7, 2012

(54) RADIO BASE STATION AND RADIO MOBILE STATION

(75) Inventors: Hirotake Ishii, Yokohama (JP); Koichi Aratani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 487 days.

(21) Appl. No.: 12/486,095

(22) Filed: Jun. 17, 2009

(65) Prior Publication Data

US 2010/0054116 A1 Mar. 4, 2010

(30) Foreign Application Priority Data

Sep. 1, 2008 (JP) .................................. 2008-223648

(51) Int. Cl.
*H04B 7/212* (2006.01)

(52) U.S. Cl. .................. 370/324; 370/350; 370/208

(58) Field of Classification Search ........... 370/310–350
See application file for complete search history.

(56) References Cited

U.S. PATENT DOCUMENTS

| | | | | |
|---|---|---|---|---|
| 4,607,230 | A * | 8/1986 | Kaku et al. ..................... | 375/376 |
| 5,694,419 | A * | 12/1997 | Lawrence et al. .............. | 375/222 |
| 5,734,647 | A * | 3/1998 | Yoshida et al. ................ | 370/335 |
| 6,661,771 | B1 * | 12/2003 | Cupo et al. ..................... | 370/204 |
| 7,230,984 | B2 * | 6/2007 | Martin et al. .................. | 375/232 |
| 7,881,398 | B2 * | 2/2011 | Mujtaba ......................... | 375/295 |
| 8,102,924 | B2 * | 1/2012 | Pisoni ............................ | 375/260 |
| 2005/0128938 | A1 * | 6/2005 | Fang et al. ..................... | 370/210 |
| 2006/0250944 | A1 * | 11/2006 | Hong et al. .................... | 370/210 |
| 2009/0175365 | A1 * | 7/2009 | Jun ................................. | 375/260 |
| 2010/0046361 | A1 * | 2/2010 | Jeong et al. .................... | 370/210 |

FOREIGN PATENT DOCUMENTS

| | | |
|---|---|---|
| JP | 2005-244593 | 9/2005 |
| JP | 2005-318512 | 11/2005 |
| JP | 2006-237964 | 9/2006 |
| JP | 2008-172541 | 7/2008 |

* cited by examiner

*Primary Examiner* — Steven H Nguyen
*Assistant Examiner* — Kenan Cehic
(74) *Attorney, Agent, or Firm* — Antonelli, Terry, Stout & Kraus, LLP.

(57) ABSTRACT

The base station transmits a synchronization signal that contains a pattern of repeated SYNC's generated by dividing FFT size by N wherein the pattern of repeated SYNC's is inverted in polarity for each of the SYNC's according to a code outputted from a code generating circuit. CP length is M/N of FFT size, and the number of divisions (M+N) of a symbol of the synchronization signal is brought into agreement with the code length L of Barker code. The mobile station detects the synchronization signal by using a first matched filter that has as many taps as (FFT size/N) stages, and uses a pattern of SYNC's generated by dividing FFT size by N as a tap coefficient, and a second matched filter that has as many taps as (M+N) stages and uses Barker code as a tap coefficient.

5 Claims, 17 Drawing Sheets

RADIO BASE STATION AND RADIO MOBILE STATION

CLAIM OF PRIORITY

The present application claims priority from Japanese patent application serial no. 2008-223648, filed on Sep. 1, 2008, the content of which is hereby incorporated by reference into this application.

BACKGROUND OF THE INVENTION

The present invention relates to a base station and a mobile station that transmit and receive radio signals, and more particularly to a radio base station and a radio mobile station that reduce the circuit size of a synchronization unit.

DESCRIPTION OF THE RELATED ART

The Orthogonal Frequency Division Multiplexing (OFDM) system digitally modulates and multiplexes plural orthogonal carriers for communication. One of the characteristics of the OFDM system is that the influence of multipath is significantly reduced by adding a guard interval called Cyclic Prefix (CP) to a signal generated by digitally modulating and multiplexing plural orthogonal carriers. The OFDM system, which enables fast digital transmission even in the environment of a multipath propagation path, is already put to practical use in the terrestrial digital television broadcasting, radio LAN, and the like, and is receiving attention.

Referring to FIG. 1, reduction in the influence of the multipath by CP addition that characterizes the OFDM system is described. FIG. 1 is a drawing illustrating the configuration of a slot and symbols. In FIG. 1(a), one slot includes five symbols. In FIG. 1(b), a symbol as a transmission signal (receive signal) includes DATA having a length of 1/f0 and CP generated by copying data having a length of Tg in a DATA trailing edge to a DATA leading edge.

In FIG. 1(c), if an FFT window position timing pulse is within the range of CP, when a portion of length 1/f0 from the rising edge of the FFT window position timing pulse is defined as an FFT window as shown in FIG. 1(d), orthogonality between carriers can be maintained. The width of a total of Tg of the portions before and after the FFT window shown by the outline arrow heads serves as a guard interval against a multipath.

In the OFDM, plural orthogonal carriers are called sub-carriers. A frequency interval between the sub-carriers is called a sub-carrier interval f0. In data on a time axis of (1/f0) length determined from the sub-carrier interval, a symbol of (Tg+1/f0) length is formed by adding a signal of Tg length of the data trailing edge to the leading edge.

As is apparent from the configuration of the symbol, since the portions of the guard interval are regarded as portions of continuous signals, when considered in units of individual sub-carriers, all sub-carriers form a continuous sine wave in a (Tg+1/f0) section. A range (1/f0) in which FFT is performed, that is, an FFT window is contained in the (Tg+1/f0) section, and if the symbol does not extend to adjacent symbols, orthogonality between sub-carriers is maintained.

Therefore, if the CP length Tg is longer than delay time of a delayed wave due to multipath, only signal from a desired symbol is extracted during execution of FFT without undergoing interference from preceding and following symbols.

Also in a radio system of the OFDM system having excellent characteristics, processing called synchronization acquisition (or synchronization detection) is required before starting communication like the CDMA system and the TDMA system. The synchronization acquisition denotes detecting symbol timing and frame timing in a mobile station from a transmission signal transmitted from a base station.

In the synchronization acquisition processing, an existing signal called a synchronization signal (also called unique word or training symbol) is previously inserted into a transmission signal transmitted from a base station, and symbol timing and frame timing are extracted by detecting the synchronization signal contained in the transmission signal in a mobile station.

In the OFDM system, detected symbol timing (FFT window position timing) is used as timing information of an FFT window position during execution of FFT in a mobile station.

In the OFDM system, in some cases, a PILOT signal (existing signal) different from a synchronization signal is inserted into a transmission signal transmitted from a base station to be used for timing detection of an FFT window position and propagation path estimation. Generally, for synchronization acquisition, a method using Matched Filter (MF) circuits, a method using auto-correlation, and a method combining them are known. In symbol timing detection in the OFDM system, the method using MF circuits (including combined use with the method using auto-correlation) is described in JP-A No. 2005-244593 and JP-A No. 2005-318512.

Referring to FIG. 2, the configuration of general MF circuits is described. FIG. 2 is a block diagram of an MF circuit. In FIG. 2, an MF circuit 100 includes a shift register 110 including k-1 flip-flops, k multipliers 115, and adder 120.

A received signal inputted to the MF circuit 100 is inputted to a multiplier 115-1 and the shift register 110 including k-1 flip-flops. K multipliers 115 multiply the received signal 1004 and output signals of k-1 flip-flops by k tap coefficients TAPs. The k tap coefficients are set to the same sequence as a synchronization signal contained in a transmission signal transmitted from the base station 1.

Outputs of the k multipliers 115 are inputted to the adder 120. The adder 120 calculates the sum of the outputs from the k multipliers 115. As correlation output 1005 from the adder 120, when a synchronization signal contained in a transmission signal of a base station is inputted, a peak signal of high correlation output is obtained as shown in FIG. 3, and when other signals are inputted, it becomes close to the value "0." FIG. 3 is a drawing illustrating correlation output of a peak signal. In FIG. 3, the horizontal axis shows time, and the vertical axis shows correlation output, which exhibits a peak value when a synchronization signal is inputted. Synchronization acquisition detects correlation output shown in FIG. 3 by threshold evaluation (radio LAN) or full search (cellular phone), and performs frame timing extraction and symbol timing extraction.

Referring to FIG. 4, IFFT processing is described. FIG. 4 is a drawing illustrating input signals and output signals of IFFT. In FIG. 4, to an IFFT circuit 316, multiple data 134 including sub-carrier signals sc0 to sc2047 matching FFT size is inputted from a multiple circuit (FFT size is assumed as 2048). Multiple data 134 including the sub-carrier signals sc0 to sc2047 is subjected to reverse Fourier transform by the IFFT circuit 316, and for each reverse Fourier transform, IFFT data 135 of 2048 samples that matches a Tfft sample, that is, FFT size is outputted.

SUMMARY OF THE INVENTION

When the OFDM system attempts to broaden a signal band to achieve faster transmission, in a synchronization circuit employing MF circuits, broadening the signal band increases the number of taps of the MF circuits, and leads to an increase in the size of the synchronization circuit. Furthermore, when a multiple signal instead of a binary signal is used as a synchronization signal, an increase in the number of taps invites an increase in the circuit size of multipliers, making the size of synchronization circuit enormous. The present invention provides a radio base station and a radio mobile station that can employ a small-size synchronization circuit.

The above-described problem can be solved by a radio base station that includes: a coding part that performs error correction coding for transmission data; a modulation part that modulates coded data; a synchronization signal generating part that generates synchronization data; a multiplexing part that multiplexes modulation data and the synchronization data; a reverse Fourier transform part that subjects multiple data to reverse Fourier transform; and a CP adding part that adds a guard interval to a reverse Fourier signal, wherein the radio base station further includes a polarity inverting part that performs polarity inversion for CP added data, the synchronization data subjected to reverse Fourier transform contains repeated SYNC's the length of each of which is one-Nth of FFT size, the CP adding part adds, as the guard interval, M units with a repetition of the SYNC' as one unit, to invert polarity, and the polarity inverting part performs polarity inversion in units of the repeated divided SYNC's.

The above-described problem can be achieved by a radio mobile station that includes: a synchronization part that extracts frame timing and symbol timing from receive data; a Fourier transform part that subjects the receive data to Fourier transform, based on the symbol timing; a demodulation part that demodulates a Fourier transform signal; and a decoding part that decodes a demodulation signal, wherein the synchronization part includes a first matched filter that has as many taps as (FFT size/N) stages and uses a pattern of SYNC's generated by dividing FFT size by N as a tap coefficient, and a second matched filter that has as many taps as (M+N) stages and uses Barker code of code length (M+N) as a tap coefficient, and the radio mobile station inputs output of the first matched filter to the second matched filter.

The present invention significantly reduces the circuit size of a synchronization circuit that becomes a problem in a radio system of the broadband OFDM system.

BRIEF DESCRIPTION OF THE DRAWINGS

Preferred embodiments of the present invention will now be described in conjunction with the accompanying drawings, in which.

DETAILED DESCRIPTION OF PREFERRED EMBODIMENTS

Preferred modes will be described using embodiments with reference to the drawings. Substantially identical members are assigned identical reference numbers to avoid duplicate descriptions. Although an OFDM radio system is used as an example, the present invention can also apply to radio LANs. Mobile stations, which are movable devices, include Personal Computers (PCs).

Figure 1:
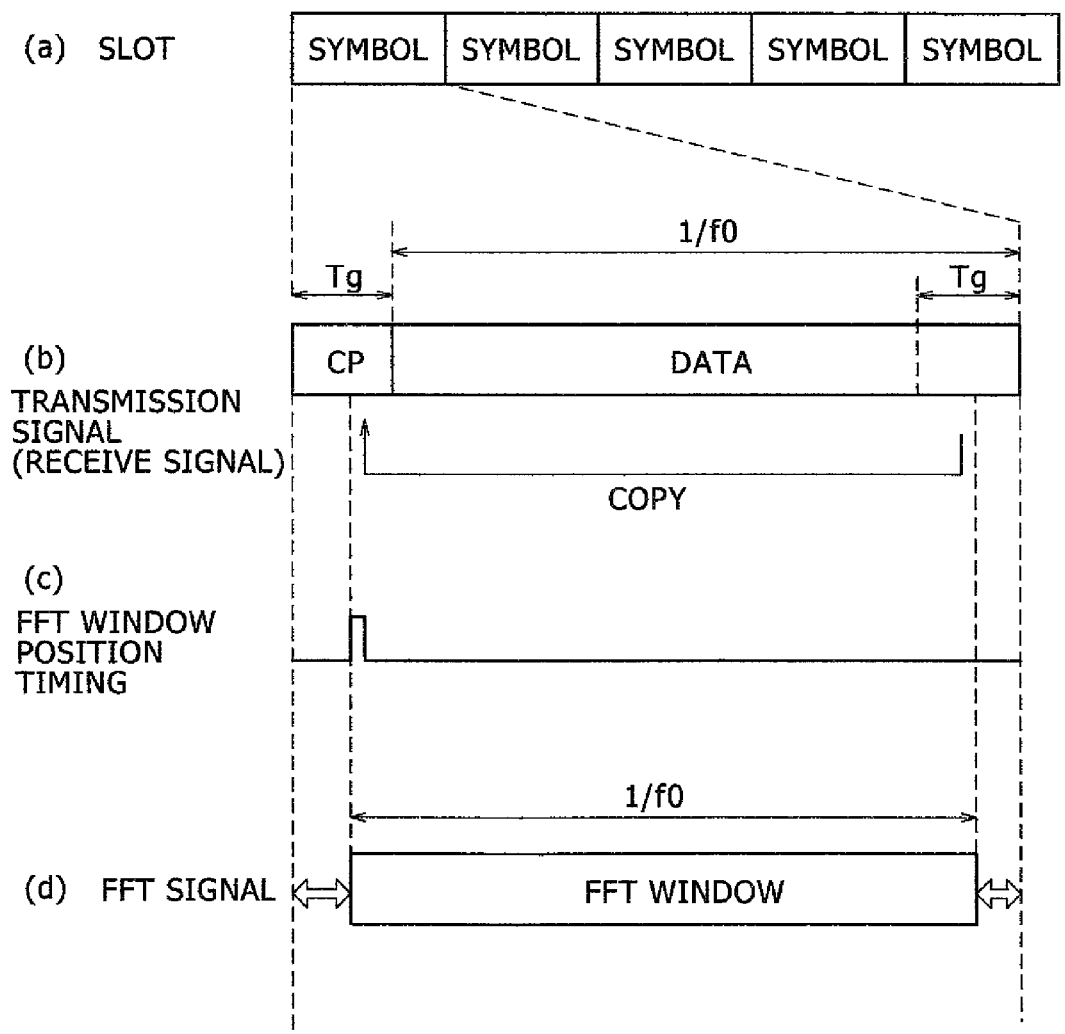
FIG. 1 is a drawing illustrating the configuration of a slot and symbols.
Figure 2:
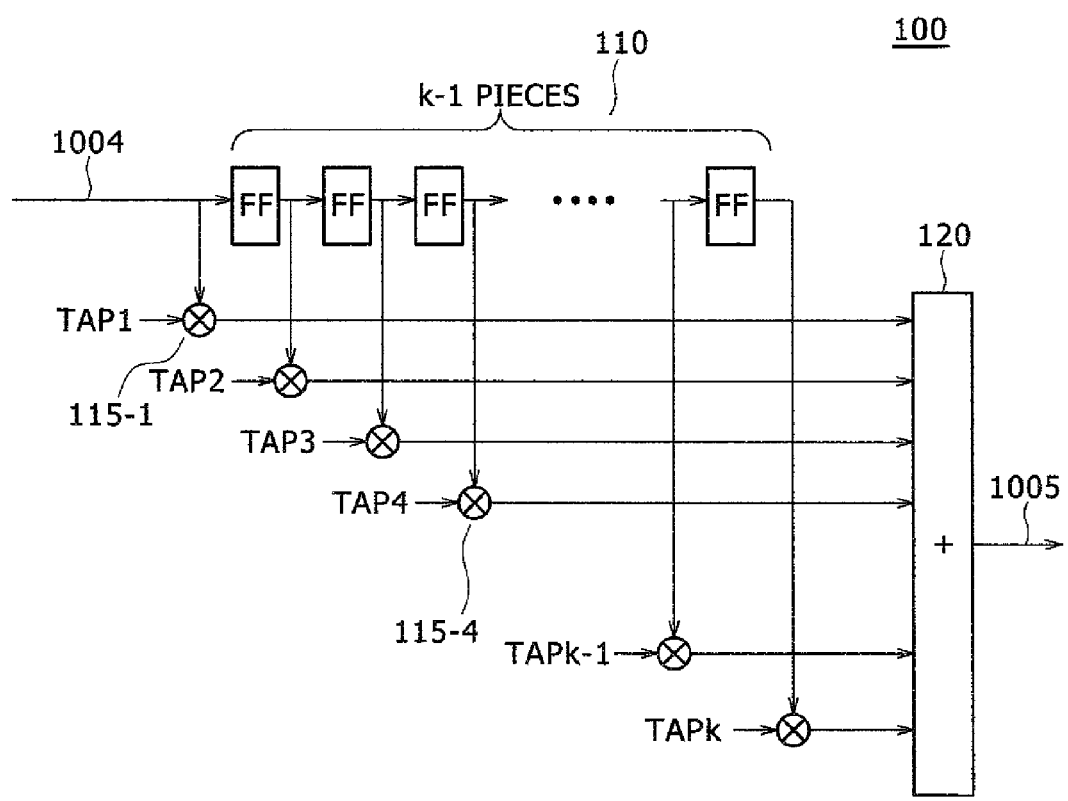
FIG. 2 is a block diagram of an MF circuit.
Figure 3:
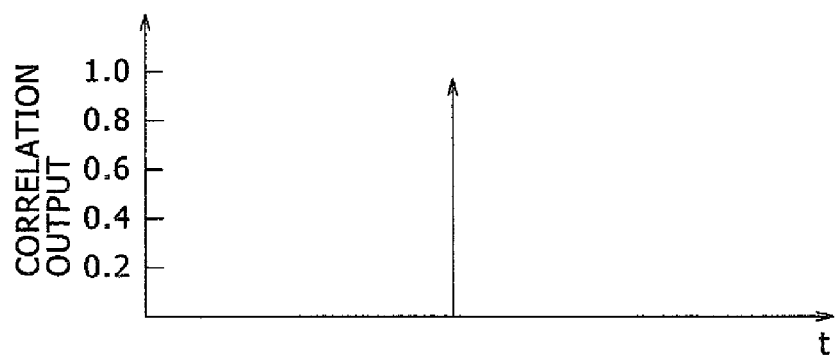
FIG. 3 is a drawing illustrating correlation output of a peak signal.
Figure 4:
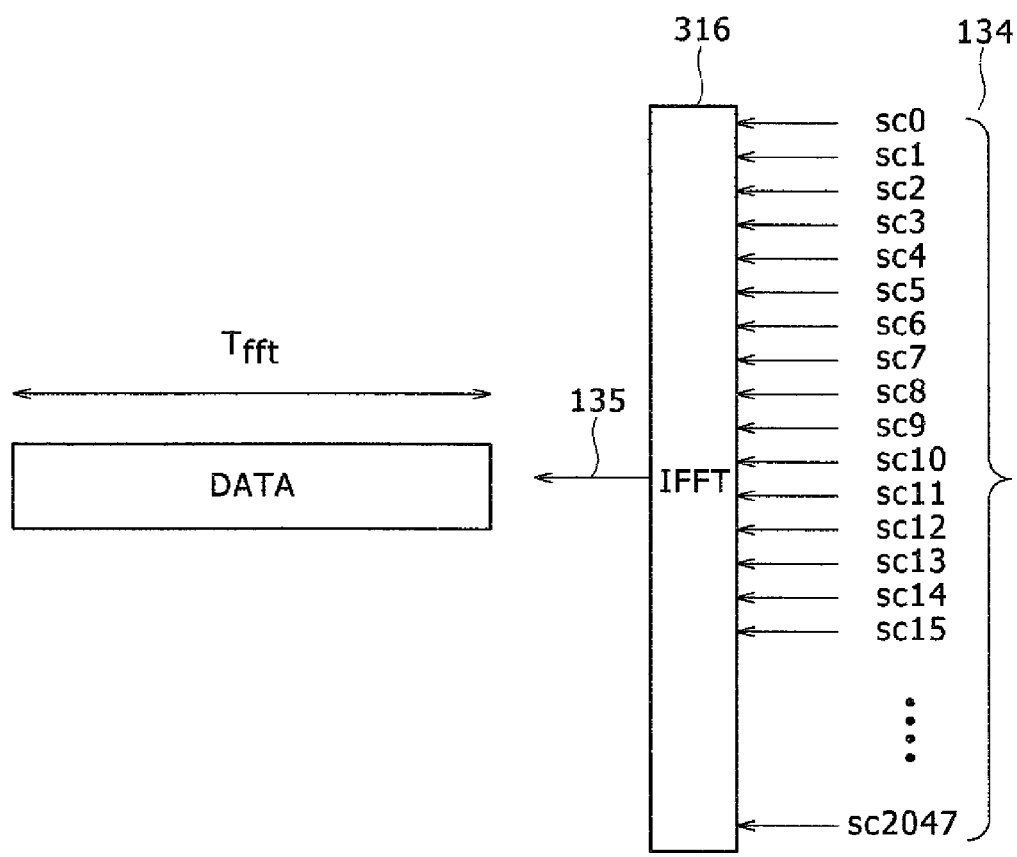
FIG. 4 is a drawing illustrating input signals and output signals of IFFT.
Figure 5:
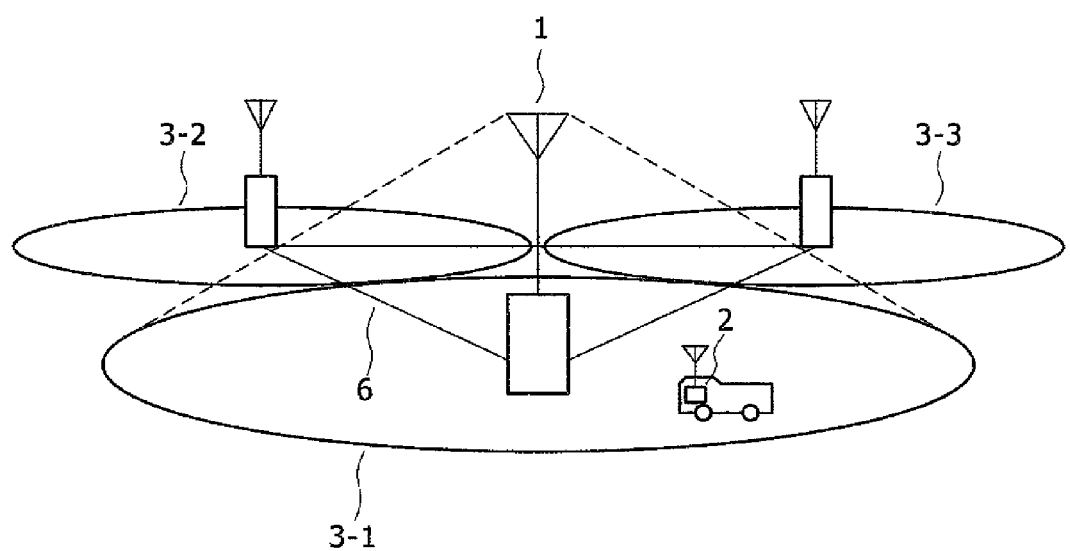
FIG. 5 is a block diagram of an OFDM radio system.

The OFDM radio system is described using FIG. 5. FIG. 5 is a block diagram of an OFDM radio system. In FIG. 5, the OFDM radio system includes a base station 1, mobile station 2, a cell 3-1 in which the mobile station 2 is located, cells 3-2 and 3-3 adjacent to the cell 3-1, and a network 6.

The base station 1 is placed in each of the cells 3. The individual base stations 1 are connected in the network 6. The mobile station 2 refers to radio equipment 2A mounted in a motor vehicle or electric train, or a cellular phone 2B carried by a pedestrian.

When communicating with the base station 1, the mobile station 2 must identify the cell 3 in which it is located. The mobile station 2, to identify the cell 3 in which it is located, receives a downstream line signal transmitted from the base station 1, and starts data communication after performing position registration and other processing.

When the mobile station 2 moves beyond one cell 3, handover control is performed between two base stations 1 connected to the network 6 to prevent a break in communication.

Here, synchronization acquisition processing necessary to perform position registration for identifying the cell 3 in which the mobile station 2 is located is described. In the synchronization acquisition processing, the frame start timing and symbol timing of a downstream line signal transmitted from the base station 1 is detected by the mobile station 2.

The base station 1 previously inserts a known signal called a synchronizing signal (SYNC signal or preamble) into the transmission signal. The mobile station 2 extracts frame timing and symbol timing by searching for the synchronizing signal contained in the transmission signal.

Figure 6:
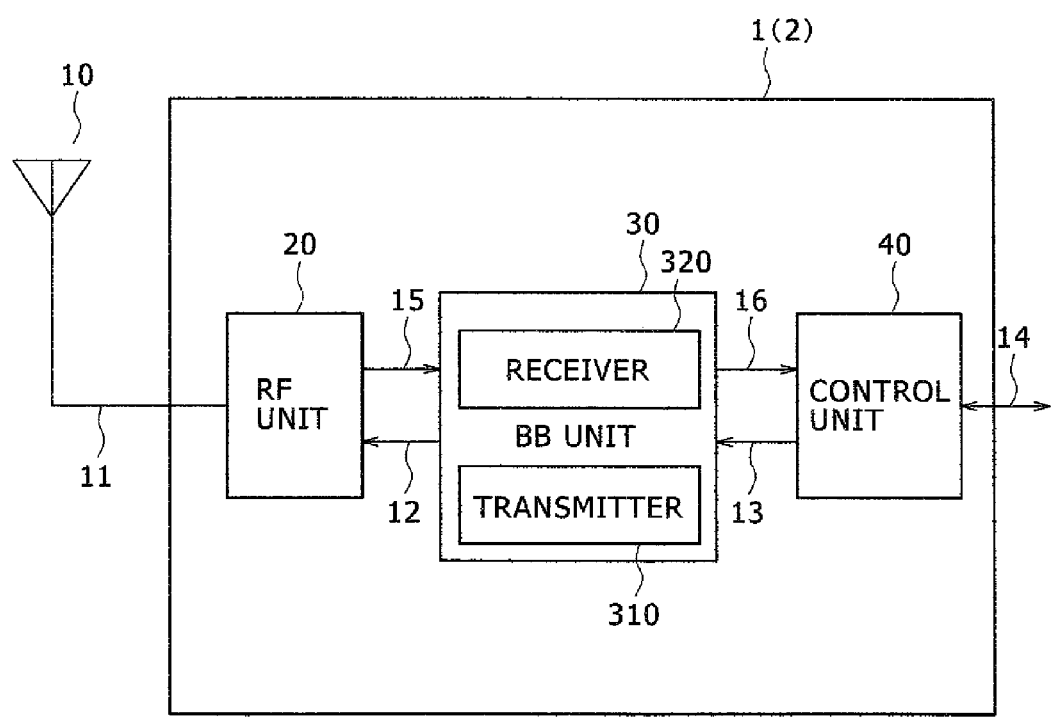
FIG. 6 is a processing block diagram of a base station.

Referring to FIG. 6, the configuration of a base station and a mobile station in the OFDM radio system is described. FIG. 6 is a processing block diagram of the base station. In FIG. 6, the base station 1 includes an antenna 10, a Radio Frequency (RF) unit 20, a Base Band (BB) unit 30, and a control unit 40. The configuration of the mobile station 2 is also the same as that of the base station 1. However, the configuration of a base station is described below.

Information data 14 transmitted from a higher-level layer is inputted to the control unit 40. The higher-level layer corresponds to a network layer of a base station, and an application layer of a mobile station. The information data 14 inputted to the control unit 40 is added with a header necessary for communication, a Cyclic Redundancy Check (CRC) code, and the like to generate transmission data 13 including frames complying with a certain predetermined format.

Transmission data 13 outputted from the control unit 40 is inputted to a transmitter 310 of the BB unit 30. The transmission data 13 inputted to the transmitter 310 of the BB unit 30 is subjected to base band signal processing such as coding, modulation, and IFFT to generate a base band digital transmission signal 12.

The base band digital transmission signal 12 outputted from the transmitter of the BB unit 30 is inputted to the RF unit 20. The RF unit 20 includes a duplexer, a Low Noise Amplifier (LNA), a band-pass filter, a mixer, an IQ modulator/demodulator, a High Power Amplifier (HPA), an AGC (Auto Gain Control), an AD/DA converter, and the like.

The base band digital transmission signal 12 inputted to the RF unit 20 is subjected to D/A conversion, IQ orthogonal modulation, frequency up-convert, band limitation, and power amplification, and is transmitted as a radio signal 11 from the antenna 10.

Meanwhile, a radio signal 11 inputted from the antenna 10 is inputted to the RF unit 20. The radio signal outputted from the antenna 10 is subjected by the RF unit 20 to TX/RX separation, low noise amplification, band limitation, frequency down-convert, gain adjustment, IQ orthogonal demodulation, and A/D conversion to generate a base band digital receive signal 15.

The base band digital receive signal 15 outputted from the RF unit 20 is inputted to a receiver 320 of the BB unit 30.

The base band digital receive signal 15 inputted to the receiver 320 of the BB unit 30 is subjected to base band signal processing such as FFT, propagation path estimation, demodulation, and error correction decoding to generate receive data 16.

The receive data 16 outputted from the receiver 320 of the BB unit 30 is inputted to the control unit 40. The receive data 16 inputted to the control unit 40 is subjected to protocol control, and transmitted to a higher-level layer as information data 14.

Figure 7:
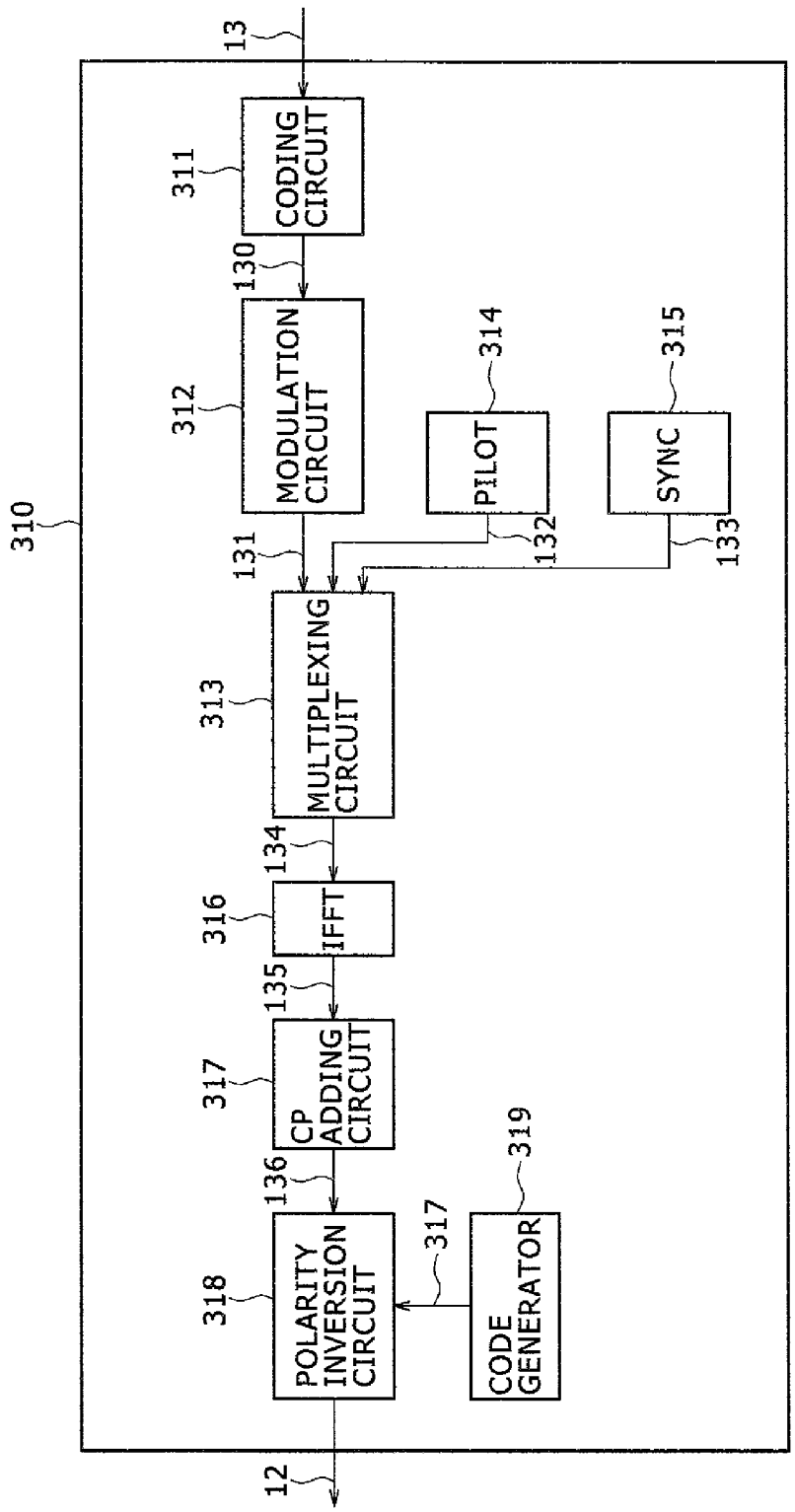
FIG. 7 is a block diagram of a transmitter of a BB unit.

The following describes the configuration of the transmitter of the BB unit with reference to FIG. 7. In FIG. 7, the transmitter 310 of the BB unit 30 in the base station 1 includes a coding circuit 311, a modulation circuit 312, a multiple circuit 313, a PILOT data generator 314, a SYNC data generator 315, an IFFT circuit 316, a CP adding circuit 317, a polarity inverting circuit 318, and a code generating circuit 319.

The transmission data 13 outputted from the control unit 40 is inputted to the coding circuit 311 of the transmitter 310 of the BB unit 30. The transmission data 13 inputted to the coding circuit 311 is subjected to error correction coding by turbo code to generate coded data 130. The coded data 130 outputted from the coding circuit 311 is inputted to the modulation circuit 312, and is subjected to 16QAM modulation to generate modulated data 131.

The modulated data 131 outputted from the modulation circuit 312 is inputted to the multiple circuit 313, and multiplexed with PILOT data 132 on the frequency axis outputted from the PILOT data generator 314, and SYNC data 133 on the frequency axis outputted from the SYNC data generator 315 before forming a downstream line signal format and turning into multiple data 134.

The multiple data 134 outputted from the multiple circuit 313 is inputted to the IFFT circuit 316, and is subjected to reverse Fourier transform to generate IFFT data 135. The IFFT data 135 outputted from the IFFT circuit 316 is inputted to the CP adding circuit 317, and is added with CP as a guard interval for preventing interference to generate CP added data 136.

The CP added data 136 outputted from the CP adding circuit 317 is inputted to the polarity inverting circuit 318, and is subjected to polarity reversal by a binary code 137 outputted from the code generator 319 to generate a base band digital transmission signal 12.

The turbo code may be another error correction code such as Viterbi code. The 16QAM modulation may be other modulation such as QPSK modulation.

Figure 8:
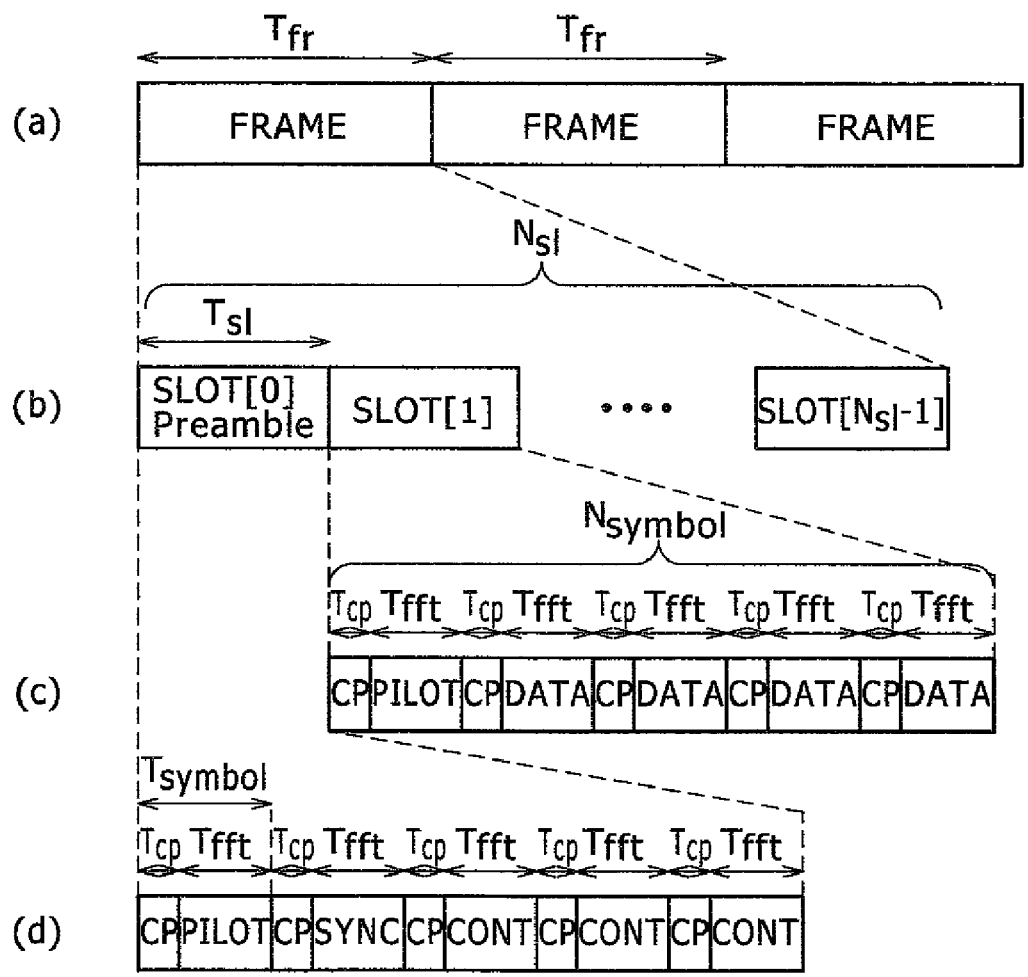
FIG. 8 is a drawing illustrating the frame configuration of a base band transmission signal.

Referring to FIG. 8, the frame configuration of a base band digital transmission signal is described. FIG. 8 is a drawing illustrating the frame configuration of a base band transmission signal. In FIG. 8(a), the base band digital transmission signal 12 includes cycled frames. In FIG. 8(b), a frame having the length of Tfr sample includes Nsl slots.

A slot having the length of Tsl sample includes Nsymbol symbols (five symbols in this example). A symbol having the length of Tsymbol sample includes CP having the length of Tcp sample and FFT data having the length of Tfft sample, and the number of Tfft samples agrees with FFT size.

Slots are different in the data contents of the slots between a start slot called a preamble and other slots. In FIG. 8(c), the preamble has, in addition to a PILOT symbol, a known fixed pattern called a SYNC symbol and CONT symbols used as control signals, and is used for purposes such as synchronization, Auto Frequency Control (AFC), and layer 2 or layer 3 control. In FIG. 8(d), slots other than the start slot include a PILOT symbol and DATA symbols, and are used for communication of user data and layer 3 information.

Figure 9:
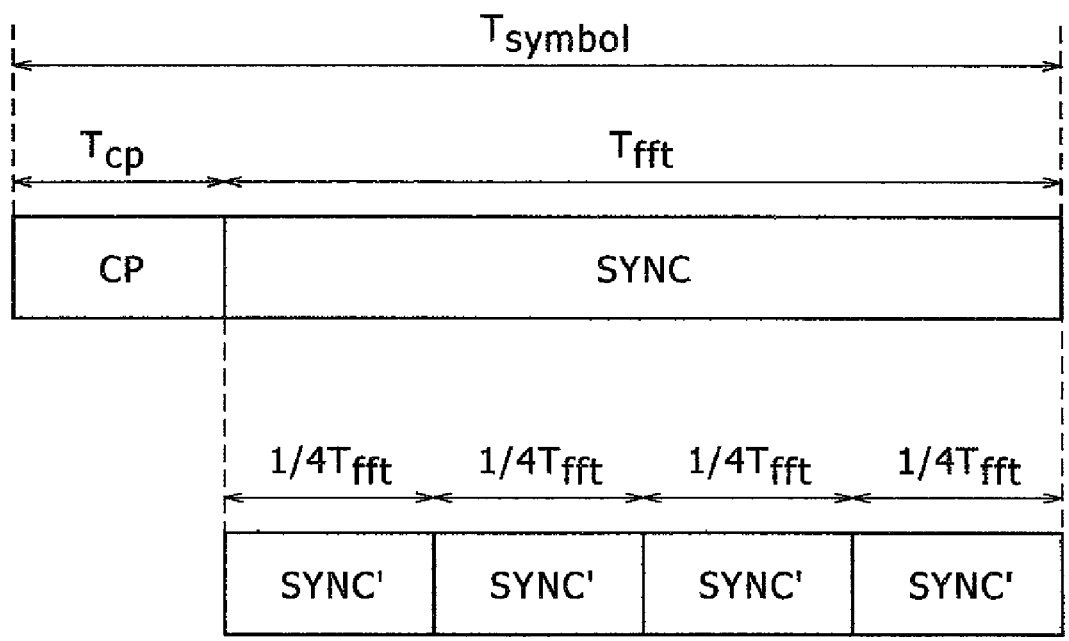
FIG. 9 is a drawing illustrating the configuration of a SYNC symbol.
Figure 10:
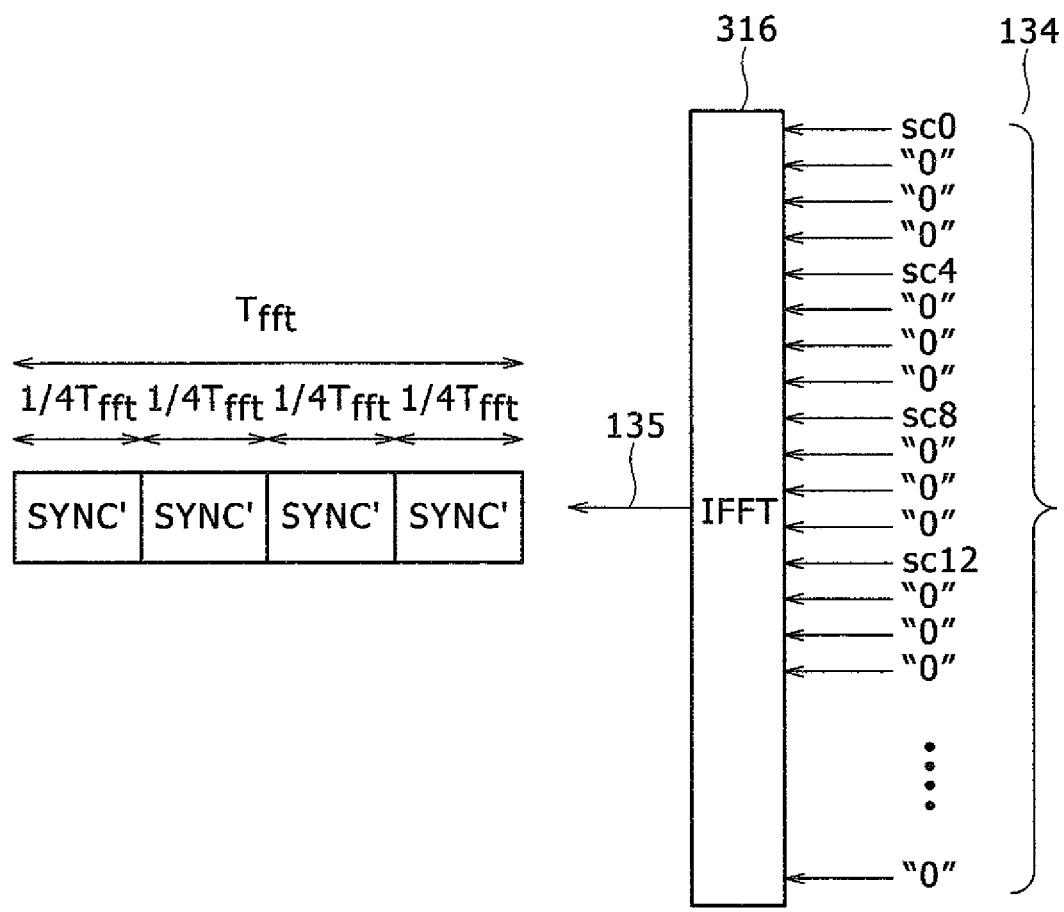
FIG. 10 is a drawing illustrating a method for generating a SYNC symbol.

A method for generating the SYNC symbol inserted into the preamble is described in detail with reference to FIGS. 9 and 10. FIG. 9 is a drawing illustrating the configuration of a SYNC symbol. FIG. 10 is a drawing illustrating a method for generating a SYNC symbol.

In FIG. 9, the SYNC symbol having the length of Tsymbol includes CP having the length of Tcp and SYNC data having the length of Tfft. SYNC data having the length of Tfft of the SYNC symbol has a pattern of repeated SYNC's each having one-fourth of the length of Tfft. The number of divisions, without being limited to four, may be N (N; positive integer).

With reference to FIG. 10, the following describes the IFFT circuit that generates a pattern of repeated one-fourth divisions of the length of Tfft sample. In FIG. 10, for multiple data 134 including sub-carrier signals sc0 to sc2047, the multiplexing circuit 313 inserts an effective sub-carrier signal every four pieces of SYNC data on a frequency axis outputted from the SYNC data generator 315, and inserts "0" in other cases. As a result, IFFT data 135 is outputted from the IFFT circuit 316 as a pattern of four repeated SYNC's, each with a ¼ Tfft sample whose length is one-fourth the length of Tfft sample.

Figure 11:
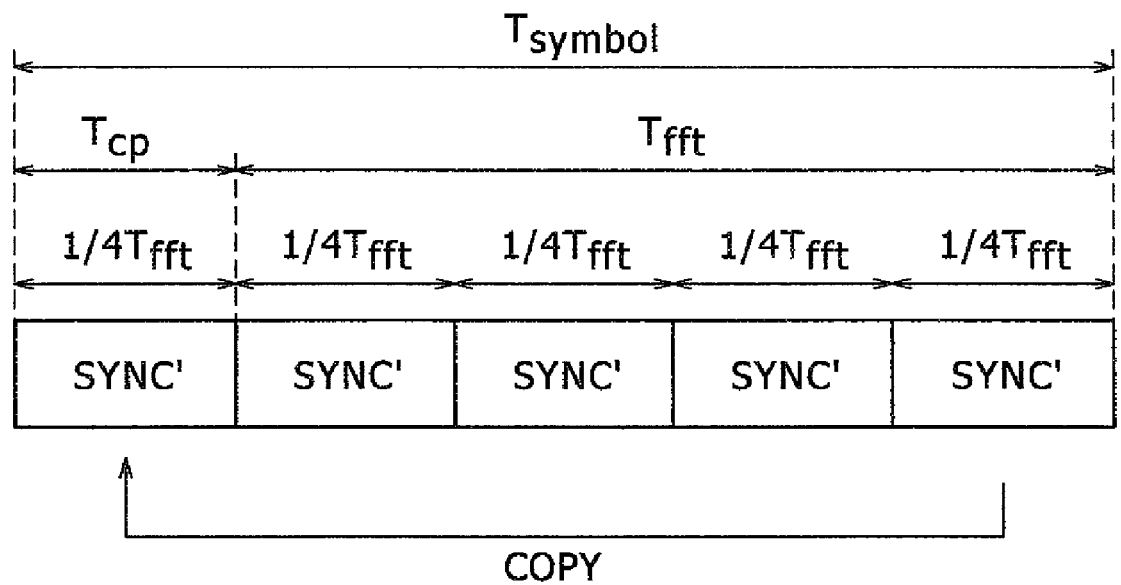
FIG. 11 is a drawing illustrating a SYNC symbol to which CP is added.

With reference to FIG. 11, the following describes SYNC data generated as a pattern of repeated SYNC's each having one-fourth of the length of Tfft wherein CP is added to the SYNC data by the CP adding circuit 317. FIG. 11 is a drawing illustrating a SYNC symbol to which CP is added. In FIG. 11, SYNC data generated as a pattern of repeated SYNC's each having one-fourth of the length of Tfft sample is added at its beginning with the last SYNC' of the SYNC data copied as CP by the CP adding circuit 317, resulting in a SYNC symbol.

Tcp sample indicating the length of CP has M/N (M and N are positive integers, and M<N) of FFT size. Thereby, by bringing the Tcp sample having the length of CP into M/N of the FFT size, the last M pieces of a pattern of repeated 1/N divisions are directly copied to the beginning.

In the above description, in FIG. 11, M=1, and N=4. The last one piece of repeated patterns of one-fourth divisions is directly copied into the beginning as CP, and a relation of Tsymbol=5/4Tfft is established. That is, a relation of Tsymbol=(M+N)/N×Tfft is established.

The SYNC data added with CP, that is, a SYNC symbol is inverted in polarity using the binary code 137 outputted from the polarity inverting circuit 318, and the code generating circuit 319 per repetitive cycle (FFT size/N).

Figure 12:
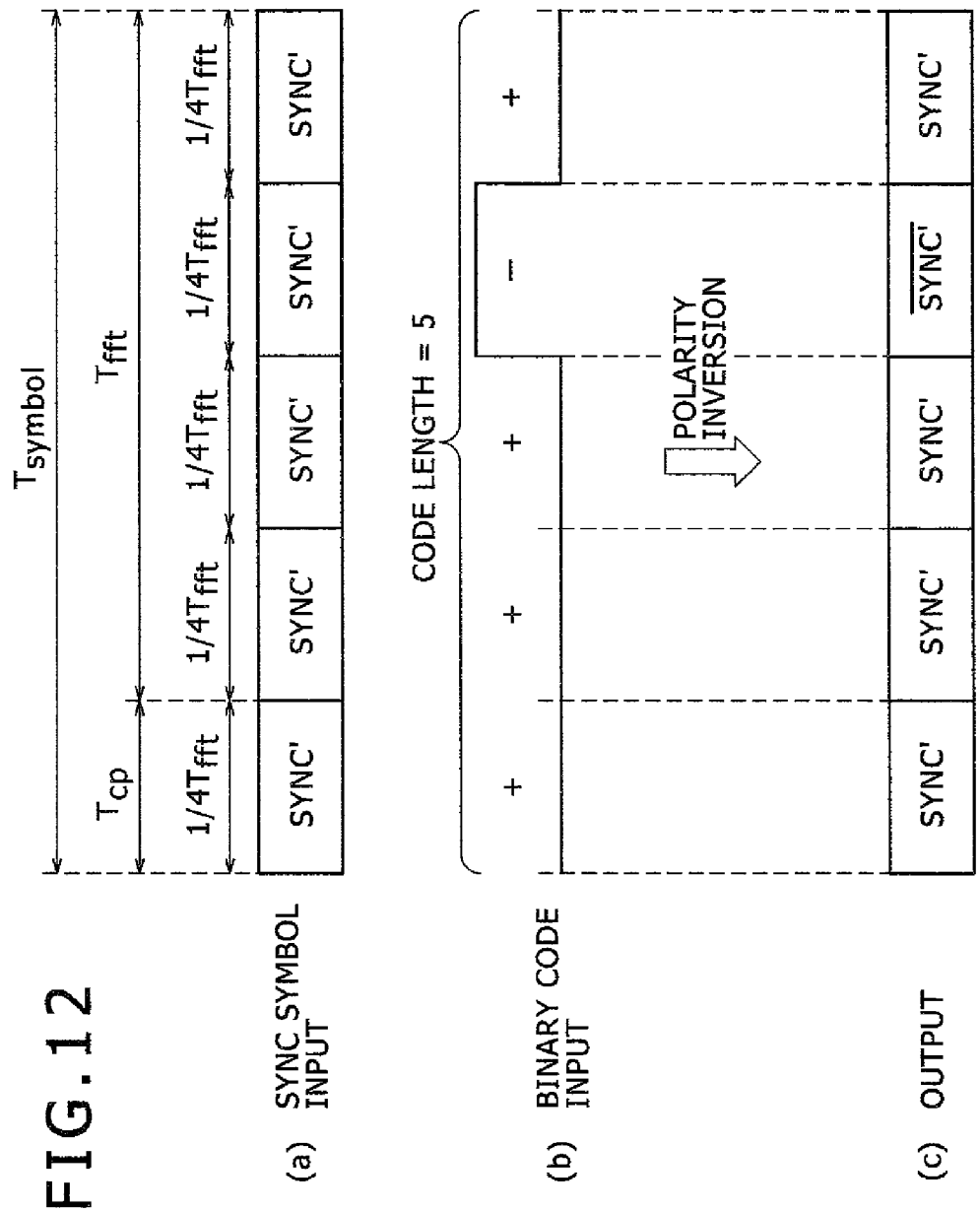
FIG. 12 is a drawing showing a SYNC symbol inputted to a polarity inverting circuit, a binary code outputted from the code generating circuit, and a SYNC symbol outputted from the polarity inverting circuit.

Referring to FIG. 12, polarity inversion of SYNC data is described in detail. FIG. 12 is a drawing illustrating a SYNC symbol inputted to the polarity inverting circuit, binary code outputted from the code generating circuit, and a SYNC symbol outputted from the polarity inverting circuit.

In FIG. 12(a), a SYNC symbol with SYNC' repeated is inputted to the polarity inverting circuit 318. In FIG. 12(b), polarity is inverted using binary Barker code having a code length of 5(M+N) outputted from the code generating circuit 319. The binary Barker code of code length 5 is +++−+. In FIG. 12(c), the output of the polarity inverting circuit 318, that is, the base band digital transmission signal 12 is −SYNC' in the fourth from the beginning. Polarity inversion means changing a positive value A to a negative value −A.

The binary code outputted from the code generating circuit uses Barker code having excellent correlation properties and the like to match the number of divisions (M+N) of a symbol to the code length L of Barker code. However, the code, without being limited to Barker code, may be another diffusion code.

Only the SYNC symbol is subjected to polarity inversion in the polarity inverting circuit 318, and for symbols other than the SYNC symbol, the output of the code generating circuit 319 is set to a non-inverted signal "0." Or, polarity inversion is stopped in the polarity inverting circuit 318.

The base band digital transmission signal 12 outputted form the polarity inverting circuit 318 is inputted to the RF unit 20 to be subjected to of processing of D/A conversion, IQ orthogonal modulation, frequency up-convert, band limitation, and power amplification, and the processed signal is transmitted as a radio signal 11 from the antenna 10.

Figure 13:
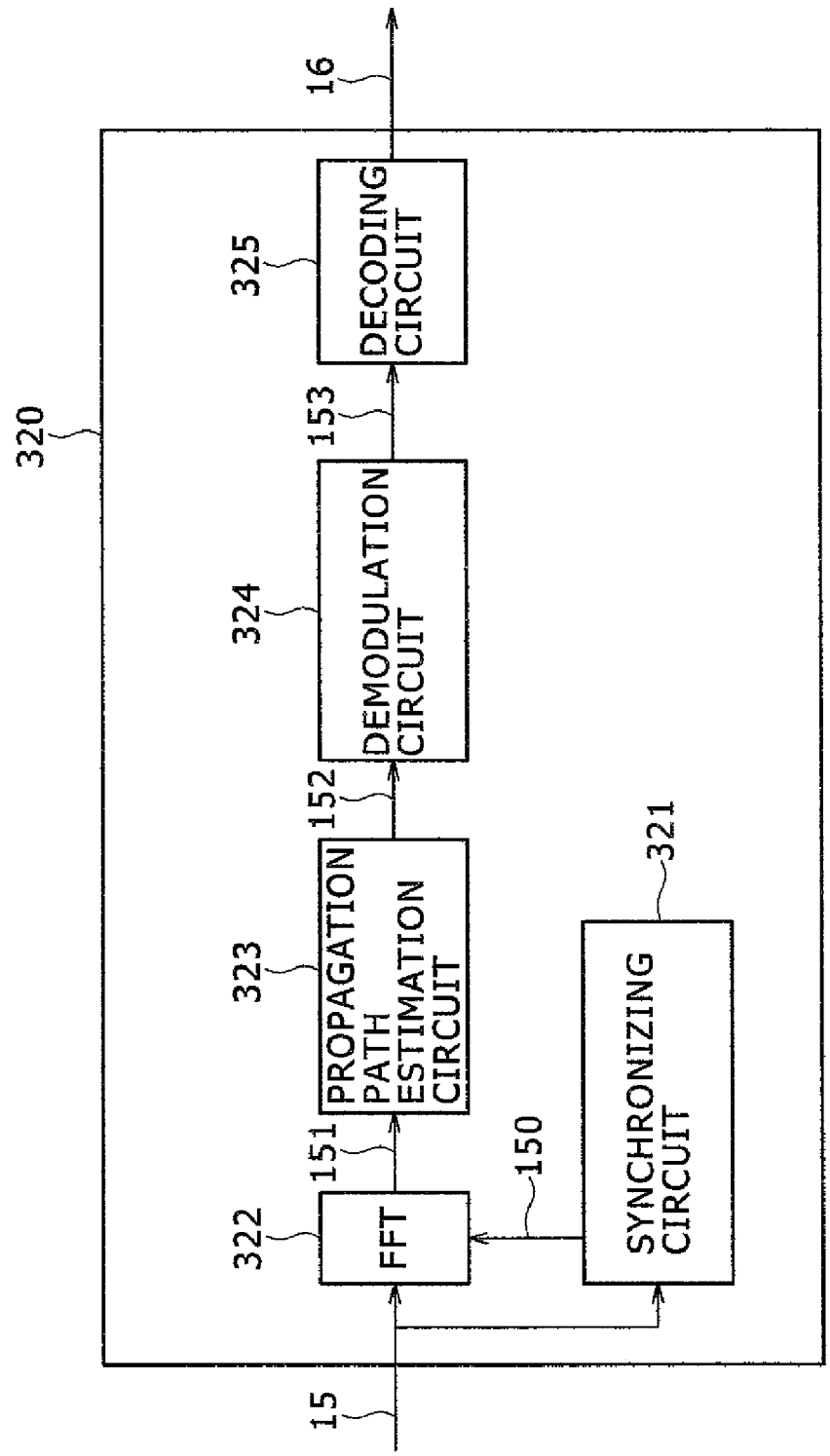
FIG. 13 is a block diagram of a receiver of a BB unit of a mobile station.

With reference to FIG. 13, the following describes the configuration of the receiver of the BB unit of a mobile station that detects a SYNC symbol transmitted from a base station. FIG. 13 is a block diagram of the receiver of the BB unit of the mobile station.

In FIG. 13, the receiver 320 of the BB unit 30 includes a synchronizing circuit 321, a FFT circuit 322, a propagation path estimation circuit 323, a demodulation circuit 324, and a decoding circuit 325. A base band digital receive signal 15 outputted from the RF unit 20 is inputted to the synchronizing circuit 321 and the FFT circuit 322.

The base band digital receive signal 15 inputted to the synchronizing circuit 321 is subjected to extraction of a synchronizing signal by the MF circuit. The synchronizing circuit 321 performs frame timing extraction and symbol timing extraction. The synchronizing circuit 321 transmits a symbol timing signal 150 serving as an FFT window position to the FFT circuit 322.

The base band digital receive signal 15 inputted to the FFT circuit 322 is subjected to Fourier transform by using the symbol timing signal 150 transmitted from the synchronizing circuit 321, resulting in FFT data 151. The FFT data 151 outputted from the FFT circuit 322 is inputted to the propagation path estimation circuit 323, and is subjected to propagation path estimation by using a PILOT signal, resulting in propagation path estimation data 152.

The propagation path estimation data 152 outputted from the propagation path estimation circuit 323 is inputted to the demodulation circuit 324 and subjected to Minimum Mean Square Error (MMSE) demodulation or Maximum Likelihood Detection (MLD) demodulation, resulting in demodulated data 153.

The demodulated data 153 outputted from the demodulation circuit 324 is inputted to the decoding circuit 324, and subjected to error correction processing of Viterbi decoding or turbo decoding that matches the coding circuit 311 of the base station, resulting in receive data 16.

Figure 14:
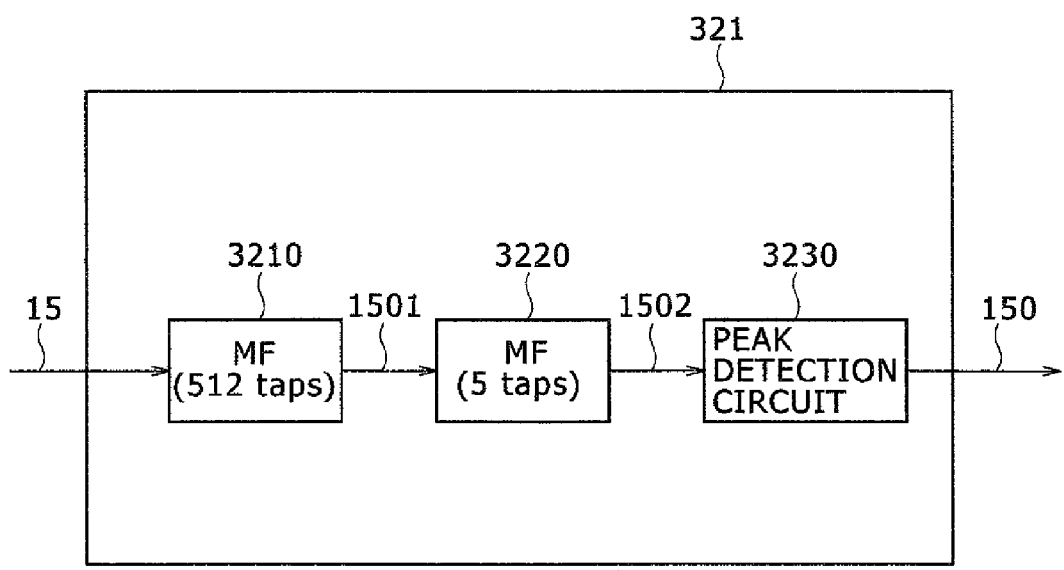
FIG. 14 is a block diagram of a synchronizing circuit.

With reference to FIG. 14, the following details the configuration of the synchronizing circuit. FIG. 14 is a block diagram of a synchronizing circuit. In FIG. 14, the synchronizing circuit 321 includes a first MF circuit 3210 having the number of taps of 512 stages, a second MF circuit 3220 having the number of taps of five stages, and a peak detection circuit 3230.

The base band digital receive signal 15 outputted from the RF unit 20 is inputted to the synchronizing circuit 321, and an I phase component of the base band digital receive signal 15 is inputted to the first MF circuit 3210.

Figure 15:
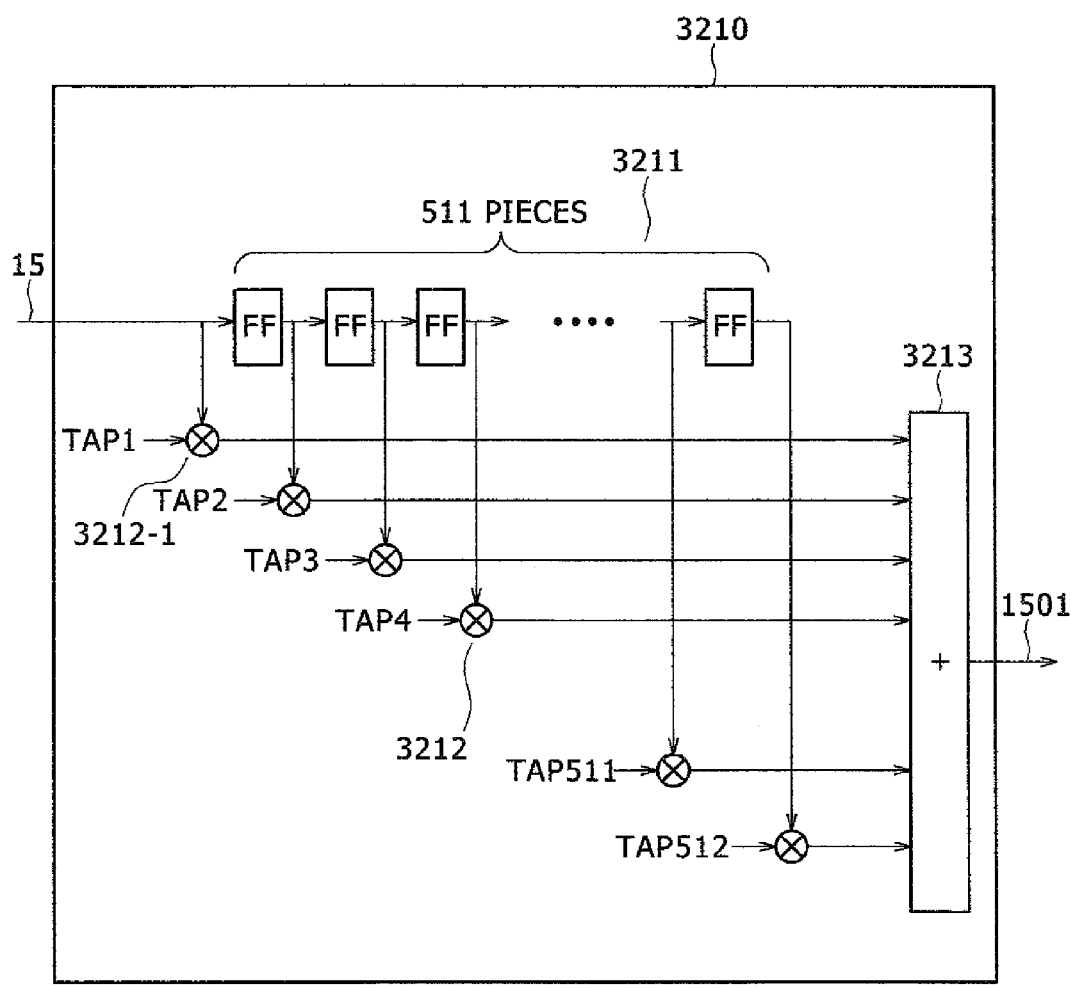
FIG. 15 is a block diagram of a first MF circuit.

Referring to FIG. 15, the first MF circuit configuration of FIG. 14 is described. FIG. 15 is a block diagram of a first MF circuit. In FIG. 15, the first MF circuit 3210 includes a shift register 3211, 512 multipliers 3212, and an adder 3213.

A base band digital receive signal 15 inputted to the first MF circuit 3210 is inputted to a shift register 3211 including 511 flip-flops, and a multiplier 3212-1. The multipliers 3212 multiply the base band digital receive signal 15 and 511 signals outputted from the flip-flops by 512 tap coefficients TAP1 to TAP512, respectively. In this case, the 512 tap coefficients are set to the same sequence as an I phase component of SYNC' shown in FIG. 11. Output of the each multiplier 3212 is inputted to the adder 3213, and the sum of outputs from all multipliers 3212 is calculated, resulting in correlation output 1501 of the first MF circuit 3210.

The correlation output 1501 of the first MF circuit 3210 becomes high when a SYNC symbol (output of FIG. 12) contained in the transmission signal of the base station is inputted, and becomes close to the value "0" when other signals are inputted.

Figure 16:
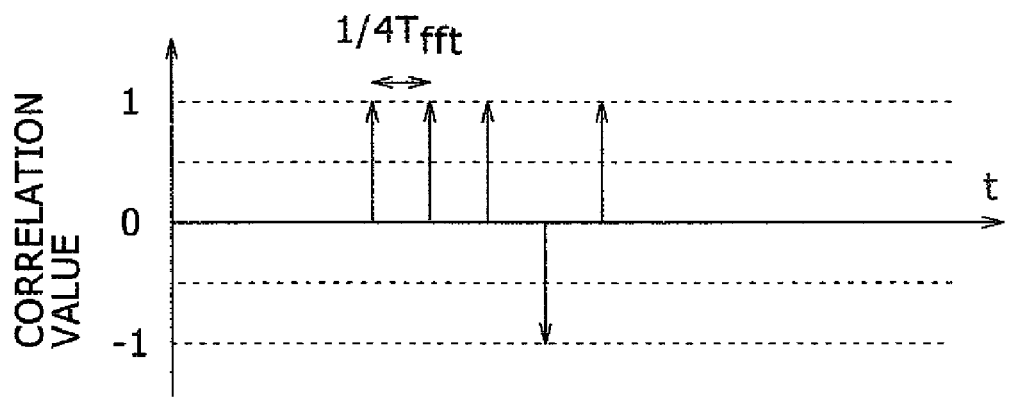
FIG. 16 is a drawing illustrating first correlation output when a SYNC symbol is inputted.

Referring to FIG. 16, first correlation output when a SYNC symbol is inputted is described. FIG. 16 is a drawing illustrating first correlation output when a SYNC symbol is inputted. In FIG. 16, the horizontal axis shows time, and the vertical axis shows correlation output values. The vertical axis shows values normalized by a maximum value of correlation output values. In FIG. 16, when a SYNC symbol is inputted to the first MF circuit 3210, the first MF circuit 3210 outputs five (=M+N) peak signals at intervals of Tfft samples. Although the height of each peak signal is the absolute value 1, the fourth peak value is −1. Other peak values are +1.

Figure 17:
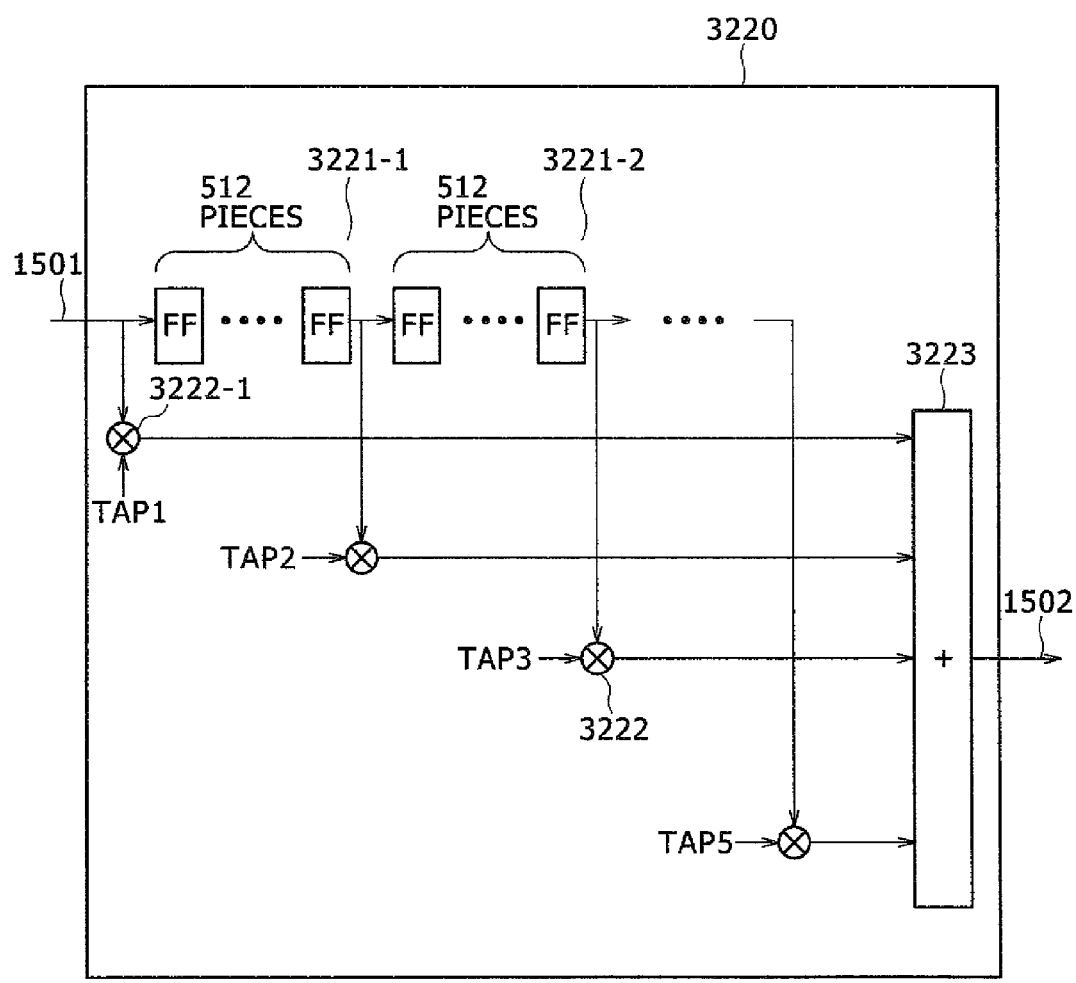
FIG. 17 is a block diagram of a second MF circuit.

The first correlation output 1501 outputted from the first MF circuit 3210 is inputted to the second MF circuit 3220. Referring to FIG. 17, the configuration of the second MF circuit is described. FIG. 17 is a block diagram of the second MF circuit. In FIG. 17, the second MF circuit 3220 includes four shift registers 3221, five multipliers 3222, and adder 3223. The shift registers 3221 include 512 flip-flops between multipliers, that is, taps.

The first correlation output 1501 inputted to the second MF circuit 3220 is inputted to a shift register 3221-1 including 512 flip-flops, and a multiplier 3222-1. The multipliers 3222 multiply the first correlation output 1501 and four signals outputted from the shift registers 3221 by five tap coefficients TAP1 to TAP5, respectively. In this case, the five tap coefficients are set to binary Barker codes shown in FIG. 12(b).

Outputs of the multipliers 3222 are inputted to the adder 3223. The adder 3223 calculates the sum of the outputs from all multipliers 3222. The calculation result is used as correlation output 1502 of the second MF circuit 3220.

The correlation output 1502 of the second MF circuit 3220 becomes high when a SYNC symbol contained in the transmission signal of the base station 1 is inputted, and becomes close to the value "0" when other signals are inputted.

Figure 18:
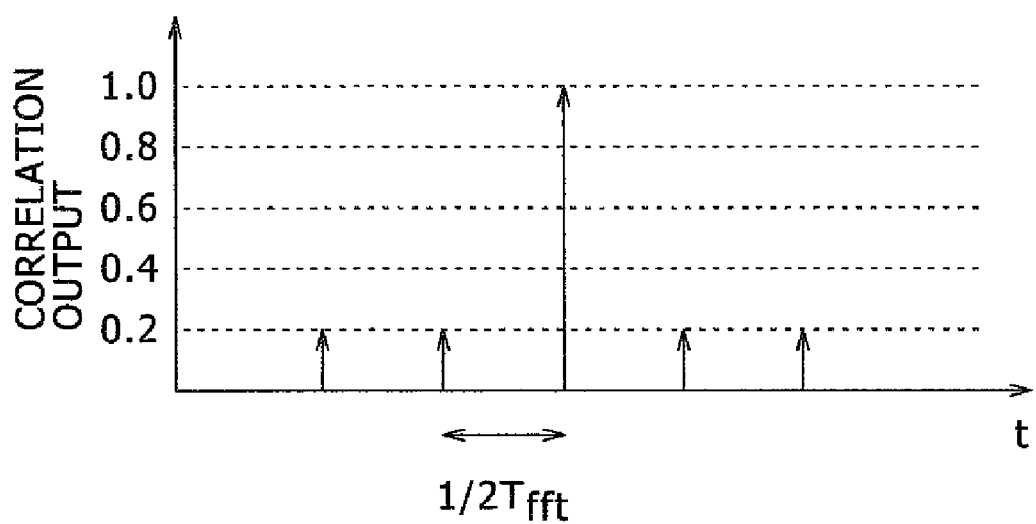
FIG. 18 is a drawing showing second correlation output when a SYNC symbol is inputted.

Referring to FIG. 18, second correlation output when a SYNC symbol is inputted is described. FIG. 18 is a drawing showing second correlation output when a SYNC symbol is inputted. In FIG. 18, the horizontal axis shows time, and the vertical axis shows correlation output values. The vertical axis shows values normalized by a maximum value of correlation output values.

In FIG. 18, when a SYNC symbol is inputted to the synchronizing circuit 321, as second correlation output, a side lobe specific to Barker codes having the magnitude of one-fifth of a maximum peak signal is outputted with a maximum peak signal at center at the interval of the half of Tfft sample.

The second correlation output 1502 outputted from the second MF circuit 3220 is inputted to the peak detection circuit 3230. After the second correlation output 1502 inputted to the peak detection circuit 3230 is averaged as required, a peak signal, that is, a SYNC symbol is detected by threshold evaluation or full search. A symbol timing signal 150 is generated based on the timing of the detected SYNC symbol, and is outputted to the FFT circuit 322.

The multipliers 3222 in the second MF circuit 3220 may be replaced by adder-subtracters. Since the tap coefficients are binary code of +1 or −1, a simple adder-subtractor that performs addition when a tap coefficient is +1, and subtraction when −1 can be achieved in small size.

Although, in this example, binary code outputted from the code generating circuit 319 is described using Barker code, other codes may also be used. Furthermore, a binary code outputted from the code generating circuit 319 may be a multilevel code. In this case, the multipliers of the second MF circuit 3220 are used as they are, instead of being replaced by adder-subtracters. In this example, for simplicity of descriptions, the first MF circuit is constructed to output only correlation output of an I phase component. However, the first MF circuit may be constructed to output correlation output of a Q phase component to provide for the Q phase component and find the sum of squares of an I phase component and Q phase component before input to the second MF circuit 3220.

This example assumes, for simplicity of descriptions, that the base band digital receive signal 15 outputted from the RF unit 20 is a synchronism-detected signal and is free from frequency offset and phase shift. However, in the case where frequency offset and phase shift remain, the first MF circuit 3210 may be constructed with four circuits and the second MF circuit with two circuits to perform complex multiplication.

When the first MF circuit is constructed with four circuits and the second MF circuit with two circuits to perform complex multiplication, the first MF circuit with an I phase component of the base band digital receive signal 15 as RXi, a Q phase component as RXq, and the same sequence of an I phase component of SYNC' as tap coefficients is defined as MFi, and the first MF circuit with the same sequence as a Q phase component of SYNC' as tap coefficients is defined as MFq, then RXi×MFi+RXq×MFq is obtained as first correlation output of I phase component, and RXq×MFi−RXi×MFq is obtained as first correlation output of Q phase components.

Next, it is constructionally conceivable that first correlation output of I phase component is inputted to a second MF circuit for I phase component, first correlation output of Q phase component is inputted to a second MF circuit for Q phase component, and the sum of squares of I phase component of the second MF circuit and correlation output of Q phase component is obtained before input to the peak detection circuit 3230.

Although synchronization acquisition of downstream lines has been described in this example, this example may be applied to synchronization acquisition of upstream lines.

According to this example, when FFT size is K, the number of divisions of the FFT size is N, and CP length is M/N, although K taps have been conventionally required as the number of taps of an MF circuit, in this example, it can be reduced to K/N+(M+N) even including a first matched filter and a second matched filter. Specifically, when K=2048, N=4, and M=1, 2048 taps have been conventionally required, but 517 taps are required in this example.

The transmitter of the BB unit in a base station may be added with a simple polarity inversion circuit and a code generating circuit, and others may be existing circuits. This example does not have the drawback that reception sensitivity deteriorates or that synchronization acquisition time becomes longer.

What is claimed is:

1. A radio base station comprising:
a coding part that performs error correction coding for transmission data;
a modulation part that modulates coded data;
a synchronization signal generating part that generates synchronization data;
a multiplexing part that multiplexes modulation data and the synchronization data;
a reverse Fourier transform part that subjects multiple data to reverse Fourier transform; and
a cyclic prefix(CP) adding part that adds a guard interval to a reverse Fourier signal,
wherein the radio base station further includes a polarity inverting part that performs polarity inversion for some of CP added data,
the synchronization data subjected to reverse Fourier transform contains a pattern of repeated SYNC's the length of each of which is one-Nth, wherein N is a positive integer of Fast Fourier Transform size, wherein FFT size is a power of two,
the CP adding part adds to the beginning of the guard interval, the last M/N SYNC' repetition of the pattern of repeated Sync's, where M is a positive integer and less than N
the polarity inverting part performs polarity inversion in units of the repeated SYNC's.

2. The radio base station according to claim 1,
wherein the polarity inverting part performs polarity inversion, based on Barker code of code length (N+M).

3. The radio base station according to claim 1,
wherein the synchronization signal generating part inserts an effective sub-carrier signal every Nth piece of SYNC data and inserts "0" in other cases.

4. The radio base station according to claim 2,
wherein the synchronization signal generating part inserts an effective sub-carrier signal every Nth piece of SYNC and inserts "0" in other cases.

5. A radio mobile station comprising:
a synchronization part that extracts frame timing and symbol timing from receive data;

a Fourier transform part that subjects the receive data to Fourier transform, based on the symbol timing;
a demodulation part that demodulates a Fourier transform signal; and
a decoding part that decodes a demodulation signal,
wherein the synchronization part includes a first matched filter that has as many taps as a Fast Fourier transform size/N stages and uses a pattern of SYNC's generated by dividing FFT size by N as a tap coefficient, and a second matched filter that has as many taps as M+N stages and uses Barker code of code length (M+N) as a tap coefficient, wherein the FFT size is a power of two; N is a positive integer; M is a positive integer less than N, and the radio mobile station inputs output of the first matched filter to the second matched filter.

* * * * *